March 29, 1966  TOSHIO KINOSHITA ET AL  3,243,693

PROGRAMMER

Filed Dec. 18, 1962  2 Sheets-Sheet 1

March 29, 1966  TOSHIO KINOSHITA ET AL  3,243,693
PROGRAMMER
Filed Dec. 18, 1962  2 Sheets-Sheet 2

United States Patent Office 3,243,693
Patented Mar. 29, 1966

3,243,693
PROGRAMMER
Toshio Kinoshita, Ichige, Katsuta-shi, and Akira Kurabayashi, Kodaira-shi, Japan, assignors to Kabushiki Kaisha Hitachi Seisakusho, Tokyo-to, Japan, a joint-stock company of Japan
Filed Dec. 18, 1962, Ser. No. 245,449
Claims priority, application Japan, Dec. 21, 1961, 36/46,217
5 Claims. (Cl. 323—94)

This invention relates to automatic control systems, and more particularly it relates to a new programmer which becomes necessary when certain kinds of program control, as will be described in detail hereinafter, are to be accomplished.

It is the prime object of the invention to provide a new programmer wherein, through the use of a program tracking means of the magnetic coupling type, the necessity for sliding parts at the time of program tracking, such as are commonly present in conventional programmers, is eliminated.

It is another object of this invention to provide a programmer as above-stated which has a simple construction and a simple and reliable operation, and which is of extreme miniature size and low cost.

Other objects and advantageous features of the programmer of this invention will presently become apparent.

The nature, principle, and details of the present invention will be best understood by reference to the following description taken in conjunction with the accompanying drawings in which like parts are designated by like reference numerals, and in which.

Figure 1:
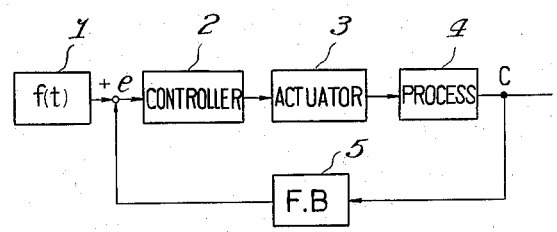
FIG. 1 is a block diagram indicating an automatic control system in which a programmer is used.

In an automatic control system as, for example, that shown in FIG. 1, when it is intended to control a certain process 4 (for example, a furnace) in accordance with a certain program $f(t)$, that is, to carry out so-called program control, it is necessary, in general, to pre-institute the said program $f(t)$ beforehand with respect to the controller 2 within the said control system. For this purpose, a programmer 1 becomes necessary. That is, by means of the programmer 1, electrical signals proportional to the program $f(t)$ are generated and compared with a signal which is produced by the detection of the control quantity, or controlled variable, C of the process 4 and its conversion into an electrical signal, and which has been fed back, through feedback 5 and an offset, or system error, $e$ is obtained. A manipulated variable for causing this offset $e$ to become zero is applied by the controller 2 and actuator 3 to the process 4 to accomplish the desired automatic control (program control).

Figure 2:
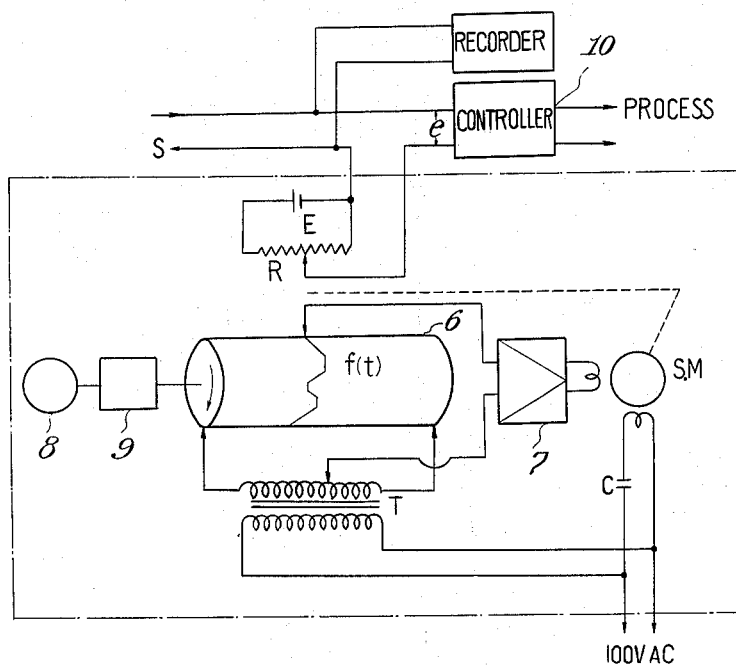
FIG. 2 is a schematic connection block diagram illustrating one example of a conventional programmer.

One example of a conventional programmer of this type is indicated in FIG. 2 (within the chain-line enclosure), wherein a drum 6 with a carbon film resistor coated thereon is caused to rotate at a certain rotational speed by a synchronous motor 8 and a speed-reduction mechanism 9, whereby the program curve $f(t)$ inscribed on the said drum 6 is traced by means of a servo mechanism composed of an amplifier 7, a servomotor SM, and other parts to cause coupled actuation of a slide-wire resistor R. Accordingly, a voltage proportional to the aforesaid program $f(t)$ is obtained and compared with a measurement signal S to obtain an offset $e$, and the required input voltage is applied to the controller 10.

Among the conventional programmers proposed heretofore, there have been programmers utilizing, as the program detecting means, electrical conductive means, photoelectric means wherein are used photoelectric tubes, capacitance means, and other. In all such cases, however, the programmers are of complicated construction and high cost utilizing servo-mechanisms; and, moreover, since the programming and detector sections require special techniques and means, changing programs is difficult.

In contrast, the present invention provides a programmer, as will be described in detail hereinafter, depending on a most simple and low-cost system wherein is utilized a simple servo-mechanism and magnetic coupling consisting of wire for programming and magnetic needles which track over said wire. Moreover, the said programmer produces a performance equal to that of a conventional programmer.

Broadly stated, the present invention contemplates a programmer of the following character. The form, or configuration, of the desired program is composed beforehand on such a medium as tape or wire made from a magnetic material, and the said medium is left attached to a base which moves at a certain speed. Said magnetic medium composed in the form of the program is tracked by so-called magnetic coupling by means of an indicating pointer which is freely rotatable and has an extreme end provided with magnetic energy. At certain periodic intervals, this pointer is clamped, and an arm sliding on a resistance wire is caused to follow up to the position at which the pointer is so clamped, whereby a direct-current voltage signal proportional to the form of the program as aforementioned is obtained.

In order to indicate still more fully the nature and details of the present invention, further description is set forth below with respect to a specific embodiment of the invention.

Figure 3:
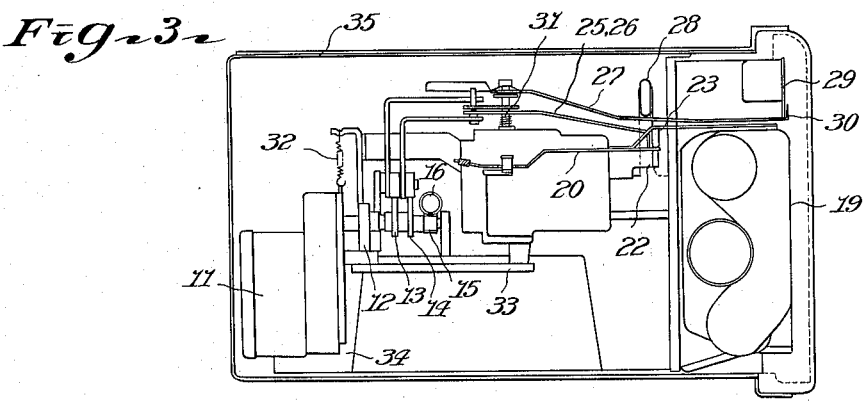
FIG. 3 is a side elevational view, with parts cut away, showing one embodiment of the programmer according to the present invention.
Figure 4:
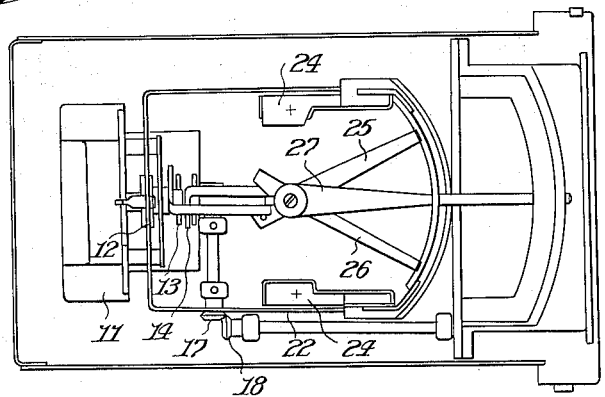
FIG. 4 is a plan view of the embodiment shown in FIG. 3.
Figure 5:
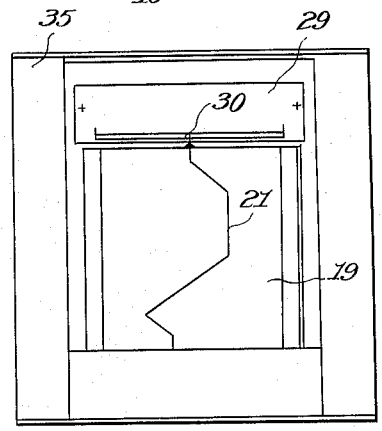
FIG. 5 is a front elevational view of the embodiment shown in FIG. 3.

Referring to FIGS. 3, 4, and 5, mechanical power for driving the mechanical system of the programmer is supplied by a synchronous motor 11, the output of which is reduced in speed by a suitable speed reduction means and then causes cams 12, 13, and 14 to rotate. A portion of this output is further reduced in speed by a worm 15 and a worm gear 16 and is then transmitted through bevel gears 17 and 18 to the front of the unit to rotate, at constant speed, a base 19 on which the predetermined program has been established. It will be obvious that the rotational speed of the base 19, that is, the programming time, can be varied at will by suitably selecting the gear ratios of the above-described gear train.

As mentioned hereinbefore, an indicating pointer 20 which has a magnetized tip and is supported in a freely rotatable manner is so disposed and adapted to track by magnetic coupling a magnetic material 21 affixed in the form of the program on the base 19. At certain periodic intervals, a clamp arm 22 is lifted by the cam 12, whereby the pointer 20 is clamped in its position at the time between this clamp arm 22 and an upper clamp plate 23. The force of this clamping action can be suitably adjusted by means of spring plates 24. Scissor plates 25 and 26, driven by cams 13 and 14, move to the said position at which the pointer 20 is clamped at periodic intervals, causing a slide wire driving arm 27 to move therewith. That is, this slide wire driving arm 27 moves as far as the position of the pointer 20 which has moved in accordance with the program, and since this arm 27, with a suitable elasticity, is sliding along the lower surface of a slide wire 28, an output voltage signal which is in accordance with the predetermined program is obtained.

In the embodiment shown, the tip of the slide wire driving arm 27 is further extended so as to appear as an indicating pointer 30 at a position confronting a scale plate 29 provided at the upper part of the front face of the unit. Accordingly, from the position of the pointer 30 on the scale plate 29, the slide wire position, that is, the value of the output voltage signal, can be read at any time.

When the synchronous motor 11 rotates further, the scissor plates 25 and 26 become uncoupled from the cams 13 and 14 and are returned by a coil spring 31 so their respective left and right end points of rest. Subsequently, the clamp arm 22 becomes disengaged from the cam 12 and is lowered by the elastic force of a spring 32, whereby the pointer 20 becomes free and moves again by magnetic coupling, following the new position of the magnetic material 21, and the above described operation is repeated.

In the embodiment shown, a constant-voltage circuit 33, which has been printed and miniaturized, to be applied to the afore-mentioned slide wire, is installed at the lower part of the unit body 34, and the entire unit is enclosed within a case 35 of small size. Accordingly, as indicated in FIGS. 3, 4, and 5, the entire programmer apparatus can be miniaturized and substantially reduced in weight.

While the present invention has been described above with respect to one embodiment thereof, it will be obvious to persons skilled in the art that this invention can be applied to almost all other types of displacement-electrical transducer elements. For example, the movement of the pointer which tracks the form of the program by magnetic coupling may be transmitted to a Hall element disposed within the magnetic field of a permanent magnet, and the output voltage, generated at a tape which is in a direction perpendicular to the constant current flowing in the said element, may be utilized to obtain an electromotive force which is in accordance with the program. As another example, the movement of the pointer may be transmitted, by utilizing a strain wire element, as the strain variation of a bonding test piece. Whereas the above-described embodiment records the program by means of a magnetized pointer tip, it is obvious that, conversely, the program-instituting material may be the carrier of the magnetism.

As is apparent from the foregoing description, the present invention affords substantial simplification of the programming mechanism and miniaturization of the equipment, whereby the labor required in the manufacture thereof is greatly reduced in comparison with that of conventional programmers, and the cost is lowered. Furthermore, by merely affixing such media as tapes and iron wires of magnetic material on recording paper of recorders and the like, for example, changes in programming can be accomplished in an extremely easy manner. Moreover, these tapes and wires can be rendered easily visible and distingiushable by suitable coloring. In addition to the above-mentioned advantages, the invention has, in addition to the above-mentioned advantages, such advantageous features as that whereby the pointer as described above can track the form of the established program with almost no physical contact by magnetic coupling, whereby this pointer undergoes displacement in direct accordance with the configuration of the program, so that various displacement-electrical transducing means can be utilized.

Although this invention has been described with respect to a particular embodiment thereof, it is not to be so limited as changes and modifications can be made therein which are within the full intended scope of the invention, as defined by the appended claims.

What is claimed is:

1. A programmer comprising a movable base; a first element consisting of a strip affixed thereto having a shape in accordance with the configuration of a desired program; a rotatable follow-up member having a second element consisting of a pointer end; only one of said elements being magnetized; means for obtaining, through the resulting magnetic coupling between said strip and said follow-up member, displacement of said follow-up member corresponding to said program configuration; a synchronous motor and driving means for moving said base; a pair of scissor plates, also driven by said motor and driving means and urged into a position thereby corresponding to said displacement; a slide wire driving arm co-acting with said scissor plates; a slide wire slidingly contacted by said driving arm, whereby an output voltage signal corresponding to said program is obtained.

2. The programmer as defined in claim 1, wherein said strip consists of a tape.

3. The programmer as defined in claim 1, wherein said strip consists of wire.

4. The programmer as defined in claim 1, wherein said first element is magnetized.

5. The programmer as defined in claim 1, wherein said second element is magnetized.

References Cited by the Examiner
UNITED STATES PATENTS

| | | | |
|---|---|---|---|
| 1,697,166 | 1/1929 | Davis | 324—112 |
| 2,590,091 | 3/1952 | Devol | 318—20.150 |
| 2,721,990 | 10/1955 | McNaney | 324—34 |
| 2,848,815 | 8/1958 | Scheu | 324—34 |

OTHER REFERENCES

Korn and Korn: Electrical Analog Computers, McGraw-Hill Book Company, 1952, QA76.4K6, pages 253, 254.

LLOYD McCOLLUM, *Primary Examiner.*

A. D. PELLINEN, D. L. RAE, *Assistant Examiners.*